(12) United States Patent
Canedo et al.

(10) Patent No.: US 8,677,334 B2
(45) Date of Patent: Mar. 18, 2014

(54) PARALLELIZATION METHOD, SYSTEM AND PROGRAM

(75) Inventors: Arquimedes Martinez Canedo, Kanagawa (JP); Hideaki Komatsu, Kanagawa (JP); Takeo Yoshizawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 12/913,822

(22) Filed: Oct. 28, 2010

(65) Prior Publication Data

US 2011/0107162 A1 May 5, 2011

(30) Foreign Application Priority Data

Oct. 30, 2009 (JP) ................................. 2009-251044

(51) Int. Cl.
*G06F 9/45* (2006.01)
(52) U.S. Cl.
USPC .......................................................... 717/149
(58) Field of Classification Search
USPC .......................................................... 717/149
See application file for complete search history.

(56) References Cited

U.S. PATENT DOCUMENTS

| 2005/0108696 A1 | 5/2005 | Dai et al. |
| 2006/0070047 A1 | 3/2006 | Narayanasamy |

FOREIGN PATENT DOCUMENTS

| JP | 04-211858 A | 8/1992 |
| JP | 08-044577 A | 2/1996 |
| JP | 2003091422 A | 3/2003 |
| JP | 2007511835 | 5/2007 |

OTHER PUBLICATIONS

Roberto Lublinerman et al., "Modular Code Generation from Synchronous Block Diagrams: Modularity vs. Code Size", Jan. 2009, ACM.*

* cited by examiner

*Primary Examiner* — Wei Zhen
*Assistant Examiner* — Lanny Ung
(74) *Attorney, Agent, or Firm* — Jon A. Gibbons; Fleit Gibbons Gutman Bongini & Bianco PL

(57) ABSTRACT

A computer-implemented method, system, and article of manufacture for parallelizing a code configured by coupling a functional block having an internal state and a functional block without any internal state. The method includes: creating and storing a graphical representation where functional blocks are chosen as nodes and connections between functional blocks are chosen as links; visiting the nodes on the graphical representation sequentially, detecting inputs from functional blocks without any internal state to functional blocks having an internal state and storing these functional blocks as a set of use blocks, and detecting inputs from functional blocks having an internal state to functional blocks without any internal state and storing these functional blocks as a set of definition blocks; and forming strands of functional blocks based on information on the set of use blocks and information on the set of definition blocks stored in association with the functional blocks.

20 Claims, 8 Drawing Sheets

| DEFINITION BLOCK \ USE BLOCK | 0 | 1 | >1 |
|---|---|---|---|
| 0 | ASSIGNED TO THE SAME STRAND AS ADJACENT BLOCKS WITH NUMBER OF USE BLOCKS=0 AND NUMBER OF DEFINITION BLOCKS=0 | ASSIGNED TO THE SAME STRAND AS ADJACENT BLOCKS WITH NUMBER OF DEFINITION BLOCKS=0 | ASSIGNED TO THE SAME STRAND AS ADJACENT BLOCKS WITH NUMBER OF DEFINITION BLOCKS=0 |
| 1 | ASSIGNED TO THE SAME STRAND AS ADJACENT BLOCKS WITH NUMBER OF USE BLOCKS=0 | ASSIGNED TO THE SAME STRAND AS DEFINITION BLOCK NOTE THAT THE BLOCK MAY BE REASSIGNED LATER FOR LOAD BALANCING | ASSIGNED TO THE SAME STRAND AS DEFINITION BLOCK |
| >1 | ASSIGNED TO THE SAME STRAND AS ADJACENT BLOCKS WITH NUMBER OF USE BLOCKS=0 | ASSIGNED TO THE SAME STRAND AS USE BLOCK | ASSIGNED REDUNDANTLY TO STRANDS OF RESPECTIVE USE BLOCKS IN USE BLOCK SET |

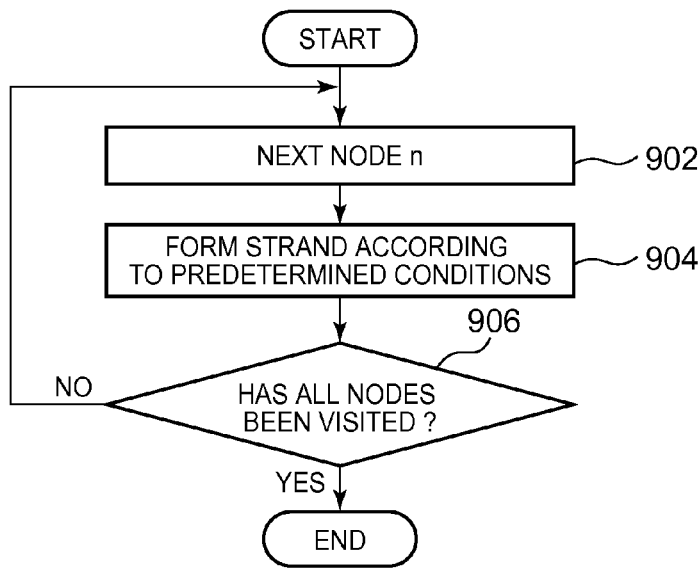

FIG. 9

| USE BLOCK \ DEFINITION BLOCK | 0 | 1 | >1 |
|---|---|---|---|
| 0 | ASSIGNED TO THE SAME STRAND AS ADJACENT BLOCKS WITH NUMBER OF USE BLOCKS=0 AND NUMBER OF DEFINITION BLOCKS=0 | ASSIGNED TO THE SAME STRAND AS ADJACENT BLOCKS WITH NUMBER OF DEFINITION BLOCKS=0 | ASSIGNED TO THE SAME STRAND AS ADJACENT BLOCKS WITH NUMBER OF DEFINITION BLOCKS=0 |
| 1 | ASSIGNED TO THE SAME STRAND AS ADJACENT BLOCKS WITH NUMBER OF USE BLOCKS=0 | ASSIGNED TO THE SAME STRAND AS DEFINITION BLOCK NOTE THAT THE BLOCK MAY BE REASSIGNED LATER FOR LOAD BALANCING | ASSIGNED TO THE SAME STRAND AS DEFINITION BLOCK |
| >1 | ASSIGNED TO THE SAME STRAND AS ADJACENT BLOCKS WITH NUMBER OF USE BLOCKS=0 | ASSIGNED TO THE SAME STRAND AS USE BLOCK | ASSIGNED REDUNDANTLY TO STRANDS OF RESPECTIVE USE BLOCKS IN USE BLOCK SET |

FIG. 10

PARALLELIZATION METHOD, SYSTEM AND PROGRAM

CROSS-REFERENCE TO RELATED APPLICATIONS

This application claims priority under 35 U.S.C. §119 to Japanese Patent Application No. 2009-251044 filed Oct. 30, 2009, the entire contents of which are incorporated by reference herein.

BACKGROUND OF THE INVENTION

1. Field of the Invention

This invention relates to a technique for speeding up the execution of a program in a simulation system through parallelization.

2. Description of the Related Art

Recently, multiprocessor systems have been used in the fields of scientific computation, simulation and the like. In such a system, an application program generates multiple processes and allocates the processes to individual processors. As an example, these processors go through a procedure while communicating with each other using a shared memory space.

In the field of simulation, the development of which has been particularly facilitated only recently, there is simulation software for plants of mechatronics such as robots, automobiles and airplanes. With the benefit of the development of electronic components and software technology, most parts of a robot, an automobile, an airplane or the like are electronically controlled by using wire connections laid like a network of nerves, a wireless LAN and the like.

Although these mechatronics products are mechanical devices in nature, they also incorporate large amounts of control software. Therefore, the development of such a product requires much time, enormous costs and a large pool of manpower to develop a control program and to test the program.

As a conventional technique for such a test, there is HILS (Hardware In the Loop Simulation). Particularly, an environment for testing all the electronic control units (ECUs) in an automobile is called full-vehicle HILS. In the full-vehicle HILS, a test is conducted in a laboratory according to a predetermined scenario by connecting a real ECU to a dedicated hardware device emulating an engine, a transmission mechanism, or the like. The output from the ECU is input to a monitoring computer, and further displayed on a display unit to allow a person in charge of the test to check if there is any abnormal action while viewing the display.

However, in HILS, the dedicated hardware device is used, and the device and the real ECU have to be physically wired. Thus, HILS involves a lot of preparation. Further, when a test is conducted by replacing the ECU with another, the device and the ECU have to be physically reconnected, requiring even more work. Further, since the test uses the real ECU, it takes time to conduct the test, resulting in an immense amount of time to test many scenarios. In addition, the hardware device for emulation of HILS is generally very expensive.

A recently introduced technique using software without using such an expensive emulation hardware device is called SILS (Software In the Loop Simulation). Using this technique, components to be mounted in the ECU, such as a microcomputer and an I/O circuit, a control scenario, and all plants such as an engine and a transmission, are configured by using a software simulator. This enables the test to be conducted without the hardware of the ECU.

As a system for supporting such a configuration of SILS, for example, there is a simulation modeling system, MATLAB®/Simulink® available from Mathworks Inc. In the case of using MATLAB®/Simulink®, functional blocks indicated by rectangles are arranged on a screen through a graphical interface as shown in FIG. 1, and a flow of processing as indicated by arrows is specified, thereby enabling the creation of a simulation program. The diagram of these blocks represents processing for one time step of simulation, and this is repeated predetermined times so that the time-series behavior of the system to be simulated can be obtained.

Thus, when the block diagram of the functional blocks or the like is created on MATLAB®/Simulink®, it can be converted to source code of an equivalent function in an existing computer language, such as C language, using the function of Real-Time Workshop®. This C source code is compiled such that simulation can be performed as SILS on another computer system.

FIG. 1 is a diagram schematically showing a loop of typical functional blocks of MATLAB®/Simulink®. The functional blocks are roughly divided into blocks having an internal state and blocks without any internal state. In FIG. 1, hatched blocks A and B are blocks having an internal state and blocks a, b and c without hatching are blocks without any internal state. In the blocks without any internal state, output data is calculated directly from input data as shown in FIG. 2(a).

On the other hand, in the blocks having an internal state, a value obtained by performing a predetermined calculation on the previous input data is held as internal data 202 as shown in FIG. 2(b), and output data is calculated using the internal data 202. Thus, the current input data is not used to calculate the current output data, and held as the internal data 202 for use in calculating the next output data after the completion of calculation of the current output data.

The following describes processing for the structure of the block diagram shown in FIG. 1. Here, it is assumed that the output of block A is $f_1$, the output of block a is $f_2$, the output of block B is $f_3$, the output of block b is $f_4$ and the output of block c is $f_5$. $f_1$ is input to block a, $f_2$ is input to block B, $f_3$ is input to block b, $f_4$ is input to block c, and $f_5$ is input to block A. Since block A and block B are blocks having an internal state, direct inputs $f_5$ and $f_2$ are not used to calculate $f_1$ and $f_3$, respectively. This is written in the following pseudo-code:

```
while (ts<EOS) {
  // output
  f1=Aout(sA)
  f2=a(f1)
  f3=Bout(sB)
  f4=b(f3)
  f5=c(f4)
  // update state
  sA=Ain(f5)
  sB=Bin(f2)
  // update time
  ts++
}
```

The above pseudo-code shows that the loop is repeated until time is reaches EOS (end of simulation). In this code, $A_{out}(\ )$ is a function for causing the block A to calculate output based on the internal state, $A_{in}(\ )$ is a function for causing the block A to calculate an internal-state variable based on the input, a( ) is a function for causing the block a to calculate output based on the input, and so on.

As seen from this pseudo-code, the block A uses its internal state to calculate output whereas the block a uses the output of the block A. Here, the outputs of the blocks B, b and c are not used.

On the other hand, the blocks B, b and c do not use both of the outputs of the blocks A and a. This suggests that A, a and B, b, c are executed in parallel, respectively. As shown in FIG. 3, after allocating processes of A and a and processes of B, b and c preferably to different processors or cores, respectively, and executing the processes in parallel, the system inputs the output of the block a into the block B and the output of the block c into the block A to advance to the following parallel execution. In other words, when a flow that ends at a block having an internal state is erased, each disconnected portion becomes executable in parallel for only a one-time iteration.

However, it is often the case that a model cannot be divided completely, i.e., parallelization is not possible just by erasing the flow that ends at a block having an internal state. For example, in the case of FIG. 1, all blocks remain connected, and as a result, parallelization cannot be performed at all. This is a phenomenon that occurs because each portion is not disconnected when there are blocks without any internal state for combining two or more signals, and this tendency is likely to prevail in many models. Therefore, high parallelism cannot be expected by the above simple method alone.

Japanese Patent Application Publication No. 2003-91422 relates to a method of automatically converting a non-parallelized source code having a multi-loop structure into a parallelized source code executable by multiple processors. Disclosed is a program P for automatically generating a ultra-parallelized source code for multiple repetition processing for automatically generating parallelized source codes executable in parallel by m processors (where m is an integer equal to two or more) from a non-parallelized source code including an n-fold nested loop (where n is an integer equal to two or more), in which an initial value expression for each n-fold loop of the non-parallelized source code SC is rewritten to an initial value expression Sj represented by using m consecutive integers iak (k=0, . . . , m−1) starting from 0 and given to m processors to uniquely identify each processor and incremental values δj each specified for each loop j (j=1, . . . , n), and using the rewritten initial value expression Sj and the incremental values δj, a function for converting the n-fold loop structure into a structure capable of being processed by the m processors in a shared manner is realized by a CPU.

Published Japanese Translation of PCT International Application Publication No. JP-T-2007-511835 discloses that a network processor is configured into a D-stage processor pipeline, a sequential network application program is transformed into multiple D-pipeline stages, and the D-pipeline stages are executed in parallel within the D-stage processor pipeline. In this case, for example, the transformation of the sequential application program is performed by modeling the sequential network program as a flow network model and selecting from the flow network model into a plurality of preliminary pipeline stages.

However, these conventional techniques do not mention any technique for enhancing parallelism within an iteration between functional blocks having a dependence upon each other across a loop (loop carried dependence).

SUMMARY OF THE INVENTION

According to one aspect of the present invention, a computer-implemented method is provided for parallelizing a code configured by coupling a functional block having an internal state and a functional block without any internal state. The method includes: creating and storing, in a memory of a computer, a graphical representation on which the functional blocks are chosen as nodes and connections between the functional blocks are chosen as links; visiting the nodes on the graphical representation sequentially, detecting inputs from the functional blocks without any internal state to functional blocks having an internal state and storing the functional blocks having the internal state in the memory as a set of use blocks, and detecting inputs from the functional blocks having an internal state to the functional blocks without any internal state and storing the functional blocks having the internal state in the memory as a set of definition blocks; and forming strands of functional blocks based on information on the set of use blocks and information on the set of definition blocks stored in association with the functional blocks.

According to another aspect of the present invention, an article of manufacture is provided which tangibly embodies computer readable instructions which when implemented, causes a computer to perform the steps of the computer-implemented method for parallelizing a code configured by coupling a functional block having an internal state and a functional block without any internal state.

Accord to still another aspect of the present invention, a computer-implemented system is provided for parallelizing a code configured by coupling a functional block having an internal state and a functional block without any internal state. The system includes: a memory of a computer; an analysis module for creating and storing, in the memory of the computer, a graphical representation on which the functional blocks are chosen as nodes and connections between the functional blocks are chosen as links; and a strand creation module for (i) visiting the nodes on the graphical representation sequentially, detecting inputs from the functional blocks without any internal state to functional blocks having an internal state and storing the functional blocks having the internal state in the memory as a set of use blocks, and detecting inputs from the functional blocks having an internal state to the functional blocks without any internal state and storing the functional blocks having the internal state in the memory as a set of definition blocks, and (ii) for forming strands of functional blocks based on information on the set of use blocks and information on the set of definition blocks stored in association with the functional blocks.

BRIEF DESCRIPTION OF THE DRAWINGS

FIG. 9 is a flowchart showing strand creation processing according to embodiments of the present invention;

FIG. 10 is a table showing the rules of the strand creation processing according to embodiments of the present invention;

DETAILED DESCRIPTION OF THE PREFERRED EMBODIMENTS

Figure 1:
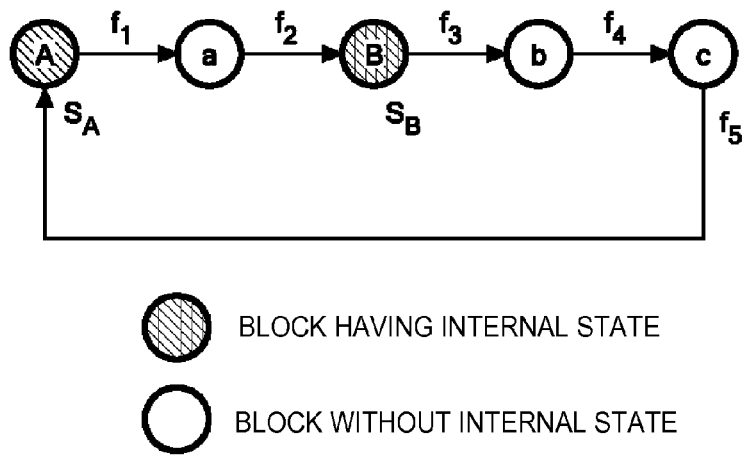
FIG. 1 is a block diagram showing an example of a loop containing functional blocks having an internal state and functional blocks without any internal state.
Figure 2:
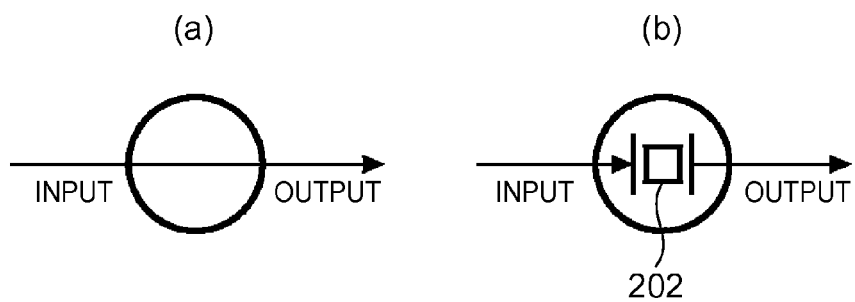
FIG. 2 is a diagram showing the mechanism of a functional block having an internal state and the mechanism of a functional block without any internal state, respectively.
Figure 3:
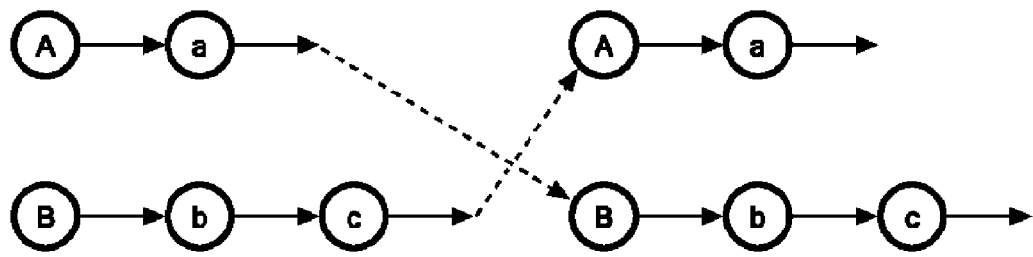
FIG. 3 is a diagram showing an example of parallelization in a block diagram.

The present invention enhances parallelism in programs containing functional blocks created by a modeling tool such as MATLAB®/Simulink®. The attributes of a set of definition blocks (definer) and a set of use blocks (user) are given to each functional block without any internal state.

When the output of a functional block without any internal state is used by functional block A having an internal state directly or indirectly without going through another block having an internal state, the functional block A is called a use block of the functional block without any internal state, and the use block becomes an element in a set of use blocks for the functional block without any internal state.

Further, when the output of functional block A having an internal state is used for calculation as the input of a functional block without any internal state directly or indirectly without going through another block having an internal state, the functional block A is called a definition block of the functional block without any internal state, and the definition block becomes an element of a set of definition blocks.

Under such a definition, a system according to the present invention visits all functional blocks sequentially by a known algorithm, such as depth-first search or breadth-first search, on the condition that a block diagram is a graph in order to list definition blocks and use blocks for each individual functional block without any internal state.

Then, when sets of definition blocks and sets of use blocks are listed for all functional blocks without any internal state, the system according to the present invention forms a group of functional blocks for each individual functional block according to a policy to be described later while visiting all the functional blocks again on condition that the block diagram is the graph. In other words, such a group of functional blocks is called a strand. Strands obtained according to the rules to be described later can be executed in parallel within one-time iteration of simulation without breaking down dependences in original processing. Since input to a block having an internal state is used only when the internal state is updated next, such a block calculation that the calculation result can be used by only a block having one internal state can be regarded as part of logic of updating the internal state of the block having the internal state, enabling a disconnection of any flow other than a flow of inputs to blocks having an internal state without breaking down the dependences.

The strand creation rules or conditions will be described in more detail below. Each individual functional block is sorted into a strand according to the following rules/conditions based on the number of elements (number of use blocks) in a set of use blocks related and the number of elements (number of definition blocks) in a set of definition blocks.

The first rule or condition is where the number of use blocks=0 and the number of definition blocks=0. In this case, the functional block is assigned to the same strand as adjacent blocks with the number of use blocks=0 and the number of definition blocks=0.

The second rule or condition is where the number of use blocks=0 and the number of definition blocks=1. In this case, the functional block is assigned to the same strand as adjacent blocks with the number of use blocks=0.

The third rule or condition is where the number of use blocks=0 and the number of definition blocks>1. In this case, the functional block is assigned to the same strand as adjacent blocks with the number of use blocks=0.

The fourth rule or condition is where the number of use blocks=1 and the number of definition blocks=0. In this case, the functional block is assigned to the same strand as adjacent blocks with the number of definition blocks=0.

The fifth rule or condition is where the number of use blocks=1 and the number of definition blocks=1. In this case, the functional block is assigned to the same strand as the definition block. Note that it may be reassigned later for load balancing.

The sixth rule or condition is where the number of use blocks=1 and the number of definition blocks>1. In this case, the functional block is assigned to the same strand as the use block.

The seventh rule or condition is where the number of use blocks>1 and the number of definition blocks=0. In this case, the functional block is assigned to the same strand as adjacent blocks with the number of definition blocks=0.

The eighth rule or condition is where the number of use blocks>1 and the number of definition blocks=1. In this case, the functional block is assigned to the same strand as the definition block.

The ninth rule or condition is where the number of use blocks>1 and the number of definition blocks>1. In this case, the functional block is assigned redundantly to the strands of respective use blocks in the set of use blocks.

Thus, after strands of the functional blocks are obtained, each strand is converted to a corresponding source code such as C source code, and the source code is compiled and allocated to each individual core or processor to execute the source code.

According to the present invention, a set of use blocks/a set of definition blocks are determined for each functional block based on the connections between functional blocks without any internal state and functional blocks having an internal state, and a strand is allocated based on the number of elements. Thus, even a block diagram, which was hard to be parallelized in conventional techniques, can be divided into strands so that processing can be parallelized.

A configuration and processing of preferred embodiments of the present invention will now be described with reference to the accompanying drawings. In the following description, the same components are denoted by the same reference numerals throughout the drawings unless otherwise noted. Although the configuration and processing are described here as preferred embodiments, it should be understood that the technical scope of the present invention is not intended to be limited to the embodiments.

Figure 4:
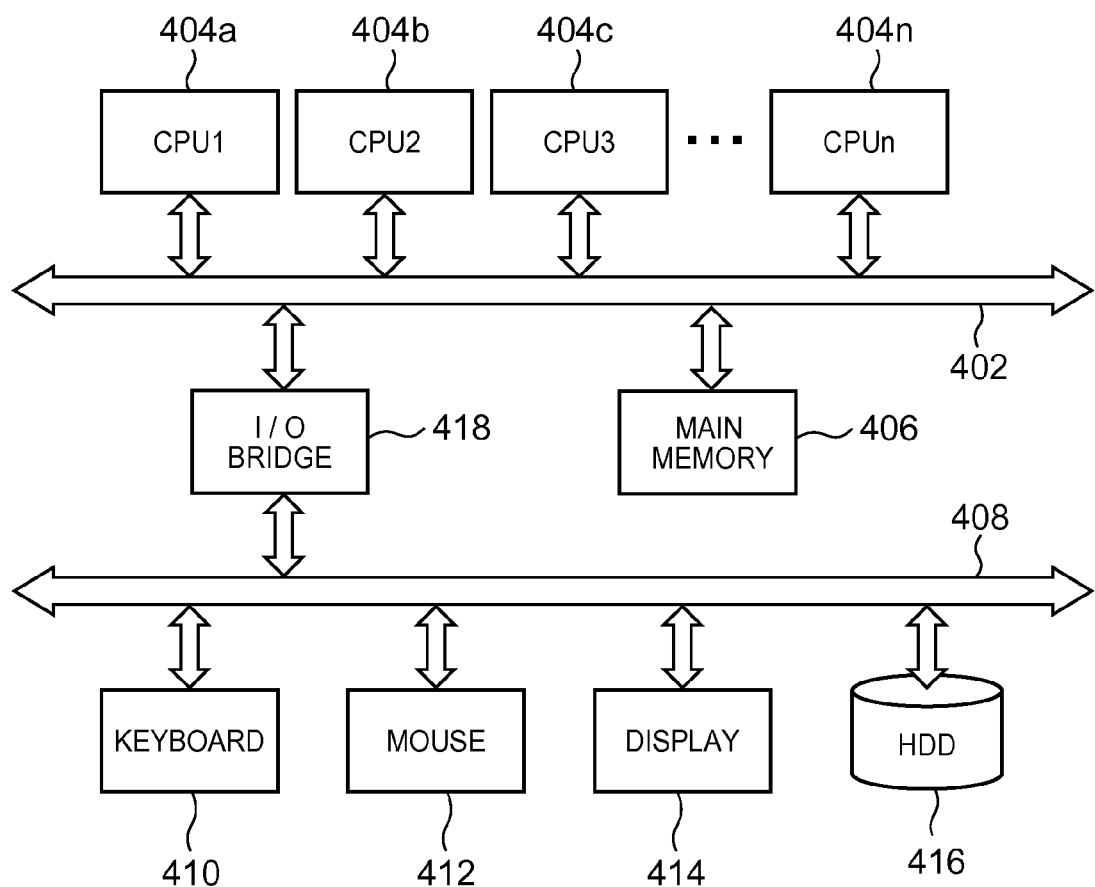
FIG. 4 is a block diagram of hardware used to carry out the embodiments of the present invention.

First, the hardware of a computer used to carry out the present invention will be described with reference to FIG. 4. In FIG. 4, multiple CPUs, i.e., CPU1 404a, CPU2 404b, CPU3 404c, . . . , CPUn 404n are connected to a host bus 402. A main memory 406 is also connected to the host bus 402 to provide the CPU1 404a, CPU2 404b, CPU3 404c, . . . , CPUn 404n with memory spaces for arithmetic processing.

On the other hand, a keyboard 410, a mouse 412, a display 414 and a hard disk drive 416 are connected to an I/O bus 408.

The I/O bus 408 is connected to the host bus 402 through an I/O bridge 418. The keyboard 410 and the mouse 412 are used by an operator to perform operations, such as to enter a command and click on a menu. The display 414 is used to display a menu on a GUI to operate, as required, a program according to the present invention to be described later.

IBM® System X can be used as the hardware of a computer system suitable for this purpose. In this case, for example, Intel® Xeon® may be used for CPU1 404a, CPU2 404b, CPU3 404c, . . . , CPUn 404n, and the operating system may be Windows® Server 2003. The operating system is stored in the hard disk drive 416, and read from the hard disk drive 416 into the main memory 406 upon startup of the computer system.

Use of a multiprocessor system is required to carry out the present invention. Here, the multiprocessor system generally means a system intended to use a processor having multiple cores of processor functions capable of performing arithmetic processing independently. It should be appreciated that the multiprocessor system can be either a multi-core single-processor system, a single-core multiprocessor system, or a multi-core multiprocessor system.

Note that the hardware of the computer system usable for carrying out the present invention is not limited to IBM® System X and any other computer system can be used as long as it can run a simulation program of the present invention. The operating system is also not limited to Windows®, and any other operating system such as Linux® or Mac OS® can be used. Further, a POWER™ 6-based computer system such as IBM® System P with operating system AIX™ can also be used to run the simulation program at high speed.

Also stored in the hard disk drive 416 are MATLAB®/Simulink®, a C compiler or C++ compiler, modules for analysis and strand creation according to the present invention to be described later, a code generation module for generating codes to be allocated to the CPUs, etc., and they are loaded to the main memory 406 and executed in response to a keyboard or mouse operation by the operator. Note that a usable simulation modeling tool is not limited to MATLAB®/Simulink®, and any other simulation modeling tool such as open-source Scilab/Scicos can be employed.

In some cases, the source code of the simulation system can also be written directly in C or C++ without using the simulation modeling tool. In this case, the present invention is applicable as long as all respective functions can be described as individual functional blocks dependent on each other.

Figure 5:
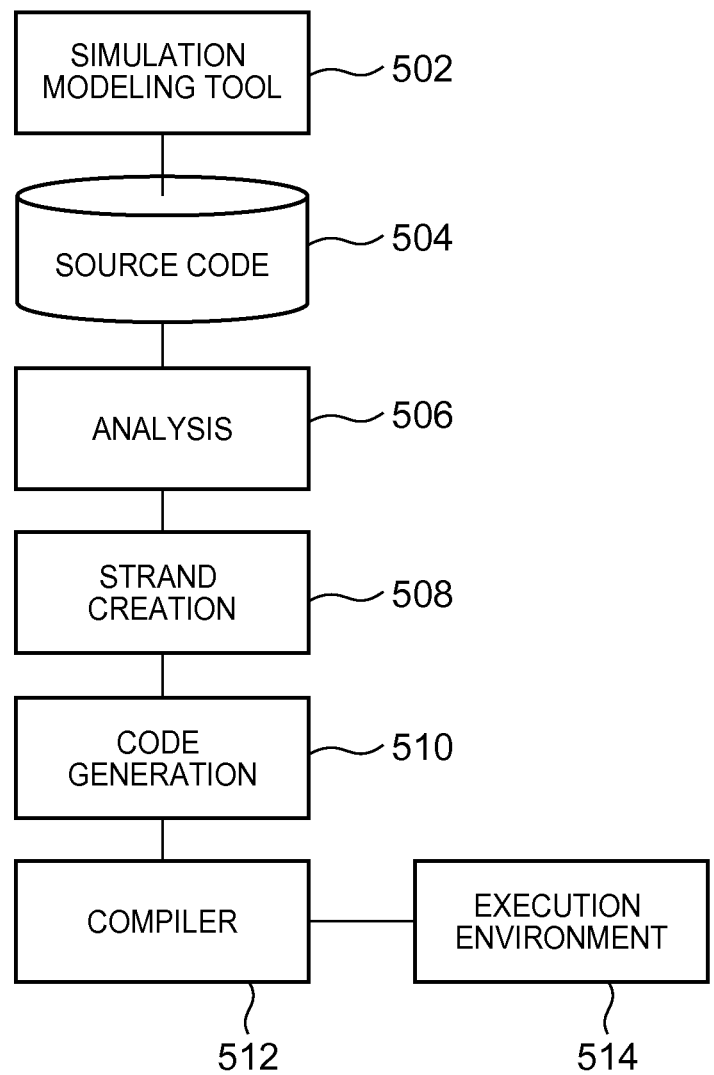
FIG. 5 is a functional block diagram used to carry out the embodiments of the present invention.

FIG. 5 is a functional block diagram according to the embodiment of the present invention. Each block corresponds to a module stored in the hard disk drive 416. In FIG. 5, a simulation modeling tool 502 can be any existing modeling tool such as MATLAB®/Simulink® or Scilab/Scicos. The simulation modeling tool 502 has the function of allowing the operator to arrange the functional blocks on the display 414 in a GUI fashion, describe necessary attributes such as mathematical expressions, and associate the functional blocks with each other if necessary to draw a block diagram. The simulation modeling tool 502 also has the function of outputting C source code including the descriptions of functions equivalent to those of the block diagram. Any programming language other than C can be used, such as C++ or FORTRAN. Particularly, an MDL file is in a format specific to Simulink®, and the MDL file can be generated to describe the dependencies among the functional blocks.

The simulation modeling tool can also be installed on another personal computer so that source code generated there can be downloaded to the hard disk drive 416 via a network or the like.

The source code 504 or output is stored in the hard disk drive 416. In addition to the source code 504, the MDL file for describing the dependencies among the functional blocks can also be stored.

An analysis module 506 receives the input of the source code 504, parses the source code 504 and transforms the connections among the blocks into a graphical representation 508. In a preferred embodiment, data of the graphical representation 508 is stored in the hard disk drive 416. Since the data structure of the graphical representation on a computer is known, the description thereof will be omitted here.

A strand creation module 508 reads the graphical representation 508 created by the analysis module 506, decide on a definition block (definer) having an internal state and a use block (user) having an internal state in association with respective functional blocks without any internal state, and creates strands based on the information. Detailed processing performed by the strand creation module 508 will be described later.

A code generation module 510 generates a source code, to be compiled by a compiler 512, based on the strand information generated by the strand creation module 508. As the programming language assumed by the compiler 512, any programming language programmable in conformity to a multi-core or multiprocessor system, such as C, C++, C#, or Java™, can be used, and the code generation module 510 generates a source code for each cluster according to the programming language.

An executable binary code (not shown) generated by the compiler 512 for each cluster is allocated to a different core or processor, preferably on a strand basis, and executed in an execution environment 514 by means of the operating system.

Figure 6:
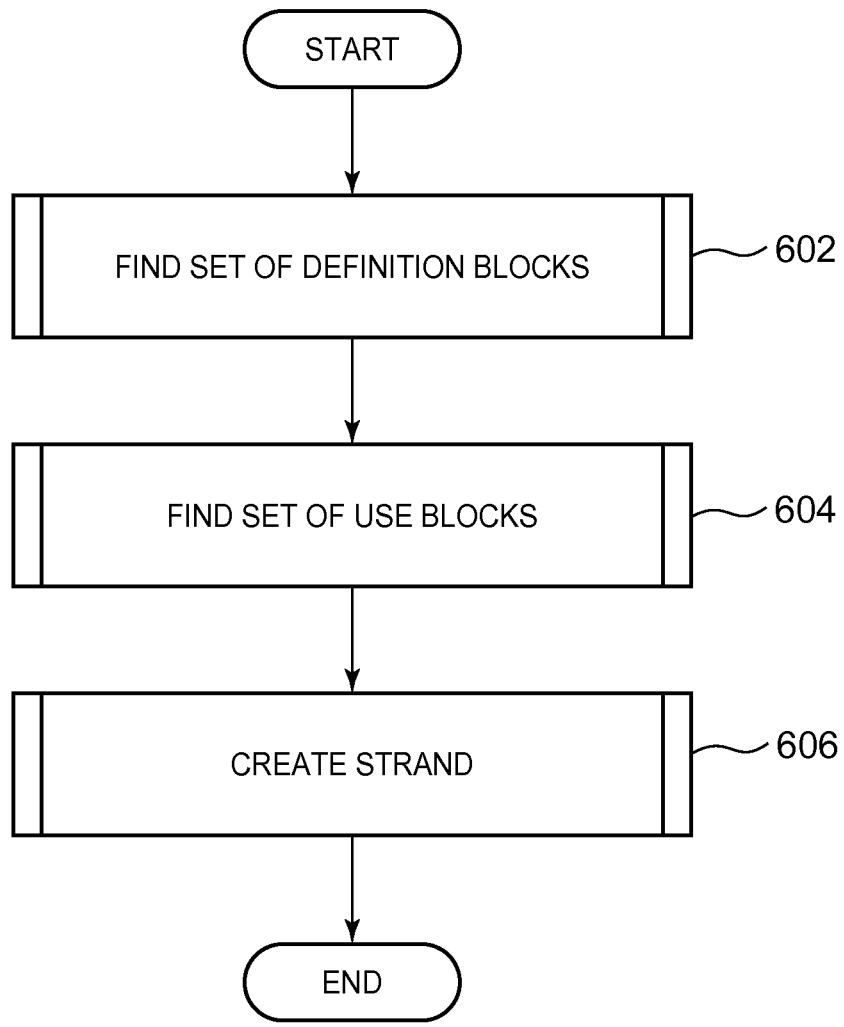
FIG. 6 is a general flowchart of the overall processing of the embodiments of the present invention.

Referring next to flowcharts of FIG. 6 and subsequent figures, processing performed by the strand creation module 508 will be described. In FIG. 6, the strand creation module 508 performs processing in step 602 for finding definition blocks on the graphical representation of the block diagram. This processing will be described in more detail later with reference to a flowchart of FIG. 7.

Next, in step 604, the strand creation module 508 performs processing for finding use blocks on the graphical representation of the block diagram. This processing will be described in more detail later with reference to a flowchart of FIG. 8.

Next, in step 606, the strand creation module 508 creates strands based on information obtained in step 602 and step 604. This processing will be described in more detail later with reference to a flowchart of FIG. 9.

Figure 7:
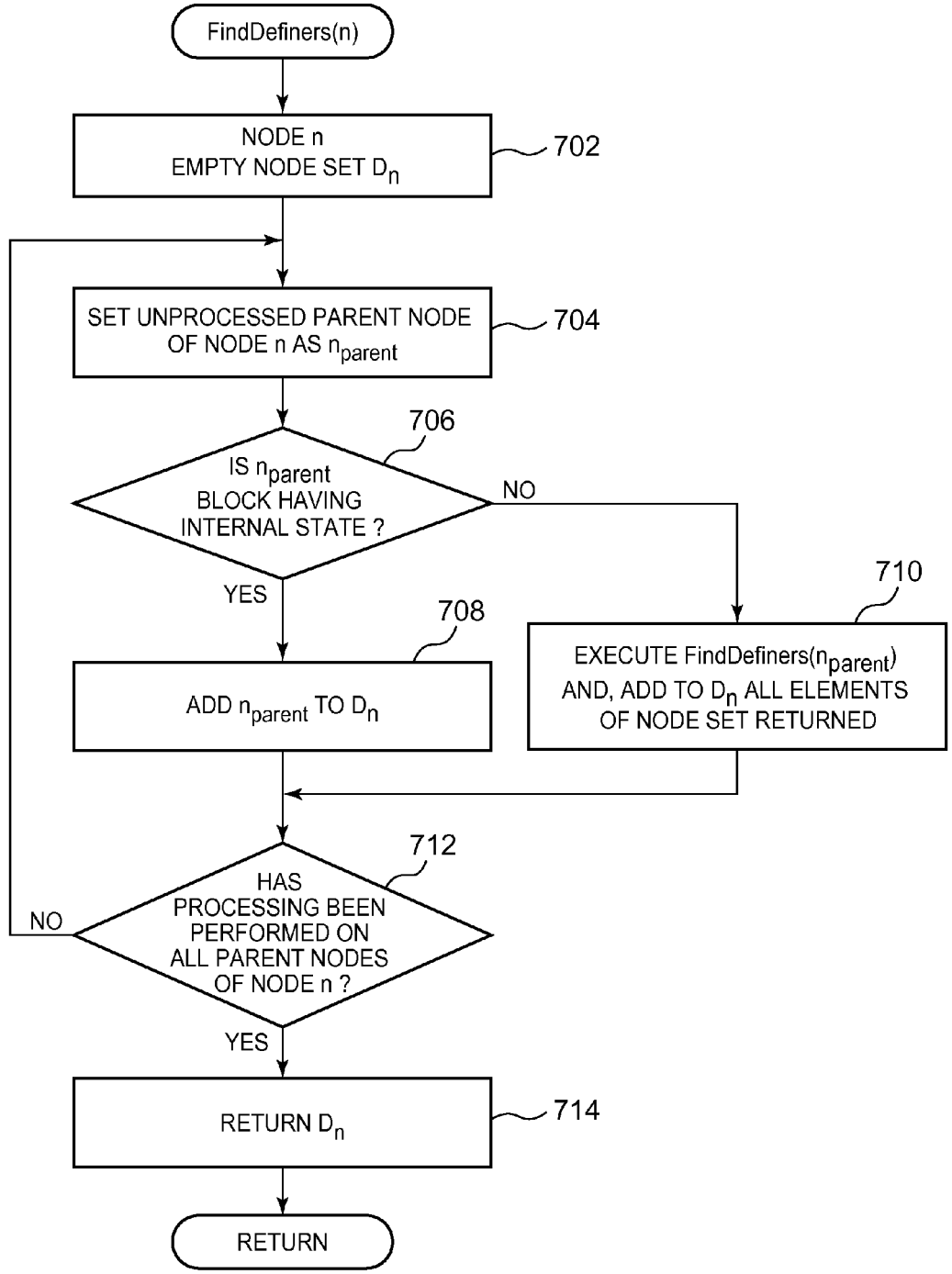
FIG. 7 is a flowchart showing processing for finding a set of definition blocks.

FIG. 7 is a flowchart showing processing FindDefiners(n) for finding definition blocks for node (functional block) n. In FIG. 7, an empty node set $D_n$ is prepared for node n in step 702.

In step 704, one of unprocessed parent nodes of node n is set as $n_{parent}$. In step 706, it is determined whether node $n_{parent}$ is a block having an internal state, and if so, $n_{parent}$ is added to $D_n$ in step 708. If it is determined in step 706 that node $n_{parent}$ is a block without any internal state, FindDefiners($n_{parent}$) is recursively called in step 710, and all elements of the returned node set are added to $D_n$.

Next, the procedure proceeds to step 712 from both step 708 and step 710. In step 712, it is determined whether processing has been performed on all parent nodes of node n, and if not, the procedure returns to step 704. If it is determined in step 712 that processing has been performed on all parent nodes of node n, $D_n$ is returned in step 714 to end the processing FindDefiners(n).

In step 602 of FIG. 6, when visiting all nodes in the graph of the block diagram sequentially and finding that node n is a block without any internal state, the strand creation module 508 applies FindDefiners(n) in FIG. 7 to obtain returned $D_n$ as a set of definition blocks for node n. On the other hand, if node n is a block having an internal state, node n itself is put into its empty block set $D_n$, setting $D_n$ as a set of definition blocks. The set of definition blocks $D_n$ obtained for each node n and their correspondences are preferably stored in the main memory 406.

Figure 8:
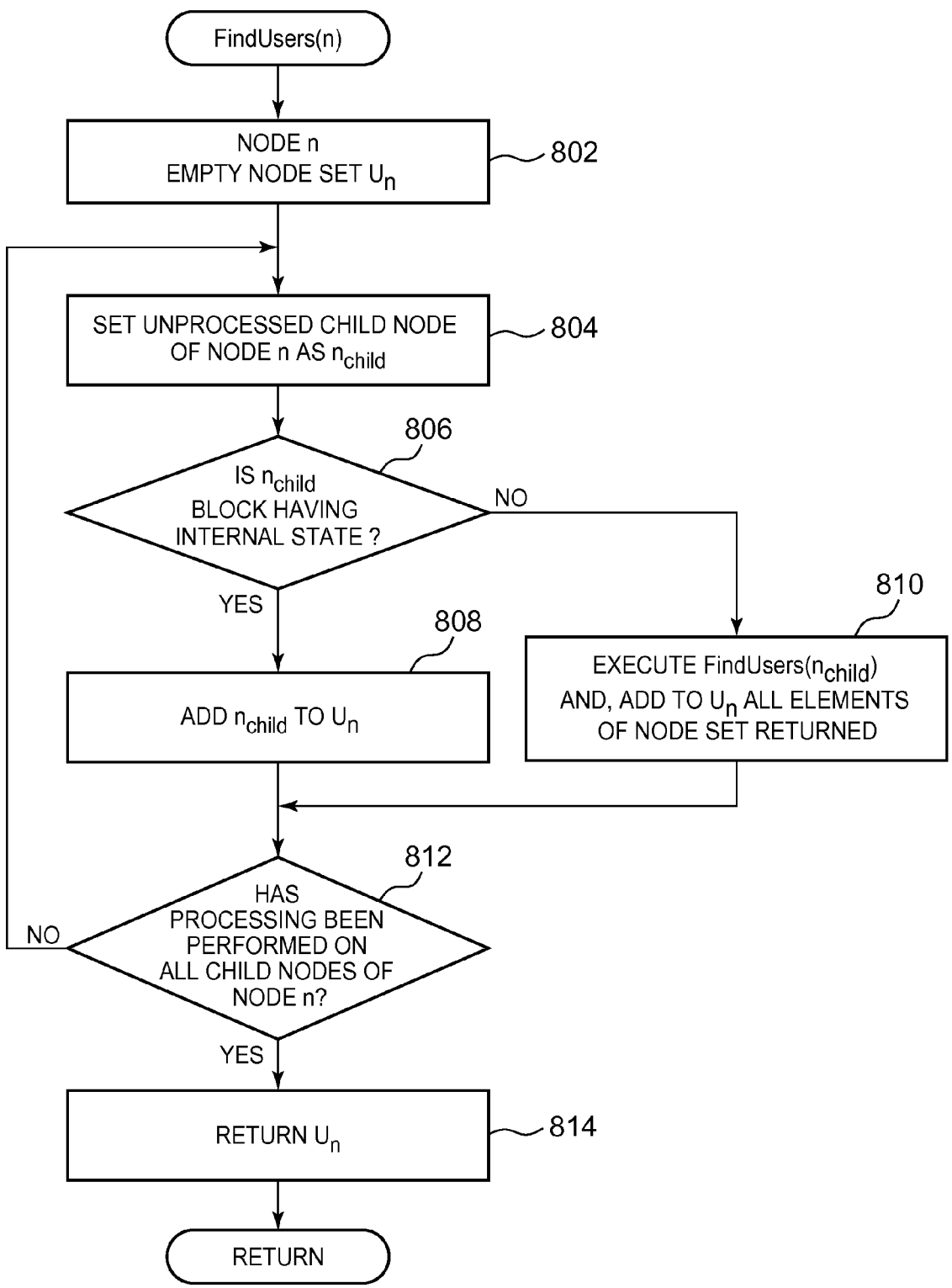
FIG. 8 is a flowchart showing processing for finding a set of use blocks according to embodiments of the present invention.

FIG. 8 is a flowchart showing processing FindUsers(n) for finding use blocks for node (functional block) n. In FIG. 8, an empty node set $U_n$ is prepared for node n in step 802.

In step 804, an unprocessed child node of node n is set as $n_{child}$. In step 806, it is determined whether node $n_{child}$ is a block having an internal state, and if so, $n_{child}$ is added to $U_n$ in step 808. If it is determined in step 806 that node $n_{child}$ is a block without any internal state, FindUsers($n_{child}$) is recursively called in step 710, and all elements of the returned node set are added to $U_n$.

Next, the procedure proceeds to step 812 from both step 808 and step 810. In step 812, it is determined whether processing has been performed on all child nodes of node n, and if not, the procedure returns to step 804. If it is determined in step 812 that processing has been performed on all child nodes of node n, $U_n$ is returned in step 814 to end the processing FindUsers(n).

In step 604 of FIG. 6, when visiting all nodes in the graph of the block diagram sequentially and finding that node n is a block without any internal state, the strand creation module 508 applies FindDeUsers(n) in FIG. 8 to set returned $U_n$ as a set of use blocks and associate the set of use blocks with node n. The content of $U_n$ and link information thereon are preferably stored in the main memory 406. On the other hand, if node n is a block having an internal state, node n itself is put into its empty block set $U_n$, setting $U_n$ as a set of use blocks. The set of use blocks $U_n$ obtained for each node n and their correspondences are preferably stored in the main memory 406.

Referring next to a flowchart of FIG. 9, strand creation processing will be described. This processing corresponds to step 606 in FIG. 6. It should be understood that at the time of starting the processing shown in the flowchart of FIG. 9, the set of definition blocks $D_n$ and the set of use blocks $U_n$ are already associated with block n in steps 602 and 604, respectively.

In FIG. 9, the strand creation module 508 visits the next node n on the graphical representation of the block diagram in step 902. At this time, the order of visiting nodes is not of concern, and any node n is selected in the first step. Next, the procedure proceeds to step 904 in which the strand creation processing is performed according to rules determining how to use information on $D_n$ and $U_n$.

FIG. 10 shows the rules or conditions. As shown, the following processing is performed depending on the number of use blocks as the number of elements in $U_n$ and the number of definition blocks as the number of elements in $D_n$.

The first rule or condition is where the number of use blocks=0 and the number of definition blocks=0. In this case, the functional block is assigned to the same strand as adjacent blocks with the number of use blocks=0 and the number of definition blocks=0.

The second rule or condition is where the number of use blocks=0 and number of definition blocks=1. In this case, the functional block is assigned to the same strand as adjacent blocks with the number of use blocks=0.

The third rule or condition is where the number of use blocks=0 and number of definition blocks>1. In this case, the functional block is assigned to the same strand as adjacent blocks with the number of use blocks=0.

The fourth rule or condition is where the number of use blocks=1 and number of definition blocks=0. In this case, the functional block is assigned to the same strand as adjacent blocks with the number of definition blocks=0.

The fifth rule or condition is where the number of use blocks=1 and number of definition blocks=1. In this case, the functional block is assigned to the same strand as the definition block. Note that it may be reassigned later for load balancing.

The sixth rule or condition is where the number of use blocks=1 and number of definition blocks>1. In this case, the functional block is assigned to the same strand as the use block.

The seventh rule or condition is where the number of use blocks>1 and number of definition blocks=0. In this case, the functional block is assigned to the same strand as adjacent blocks with the number of definition blocks=0.

The eighth rule or condition is where the number of use blocks>1 and number of definition blocks=1. In this case, the functional block is assigned to the same strand as the definition block.

The ninth rule or condition is where the number of use blocks>1 and number of definition blocks>1. In this case, the functional block is assigned redundantly to the strands of respective use blocks in the set of use blocks.

Such rules or conditions can be described in the following example statements:

```
if ( number of definition blocks == 0 && number of use blocks == 0 ) {
   processing;
} else if ( number of definition blocks == 1 && number of use blocks == 0 ) {
   processing;
}
```

After allocating the above strand(s) in step 904, the strand creation module 508 determines in step 906 whether all nodes has been visited, and if so, this processing is ended, while if not, the procedure returns to step 902. The strands thus created are compiled by the compiler 512, respectively, and executed in parallel in the execution environment 514, preferably by being allocated to individual CPU1 to CPUn.

Figure 11:
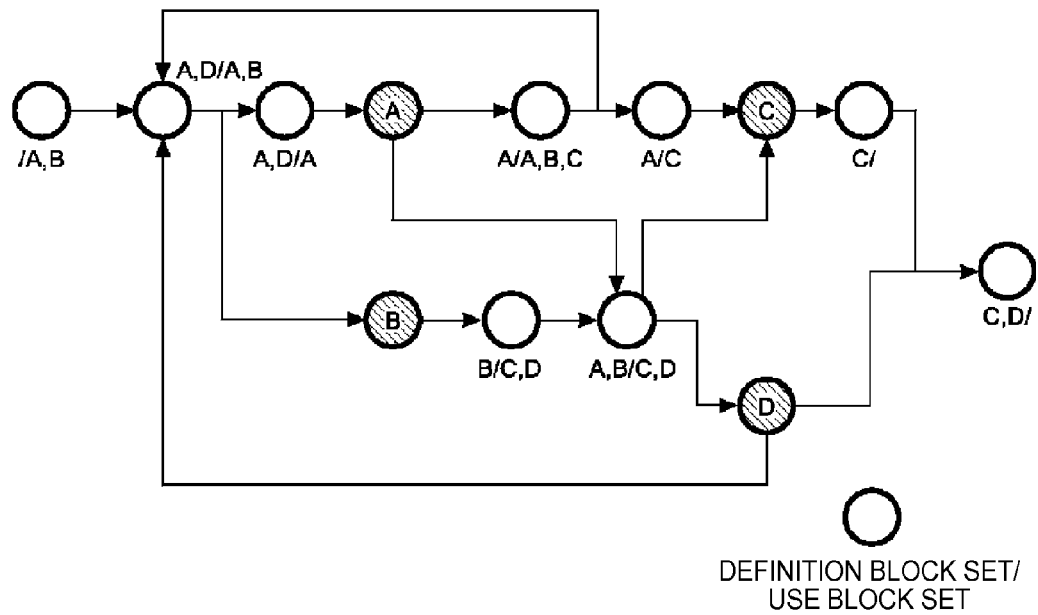
FIG. 11 is a diagram showing an example of finding a set of definition blocks and a set of use blocks in a graph of a block diagram according to embodiments of the present invention.

FIG. 11 is a diagram showing the result of applying step 602 and step 604 to a block diagram. In FIG. 11, hatched blocks with A, B, C and/or D written are blocks having an internal state, and hollow blocks are blocks without any internal state.

As a result of applying step 602 and step 604, the association of blocks having none of, or one or more internal states is calculated as a set of definition blocks/a set of use blocks for each block having an internal state.

Figure 12:
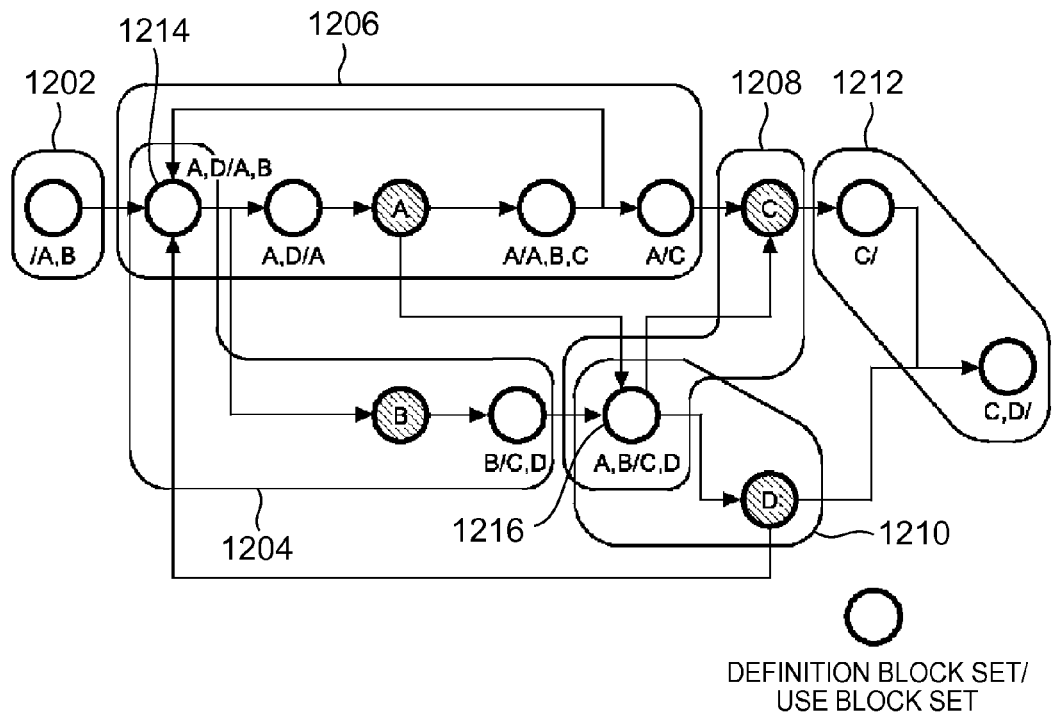
FIG. 12 is a diagram showing the result of processing for forming strands based on the set of definition blocks and set of use blocks found according to embodiments of the present invention.

Next, step 606, i.e., the processing in the flowchart of FIG. 9 is applied to the graph in the block diagram of FIG. 11 to form strands 1202, 1204, 1206, 1208, 1210 and 1212 as shown in FIG. 12. In particular, it should be noted that, as the sets of definition/use blocks=A,D/A,B and the sets of definition/use blocks=A,B/C,B, when plural blocks exist in each of the set of definition blocks and the set of use blocks, respectively, each block is shared between plural strands. For example, block 1214 is shared by strand 1204 and strand 1206, and block 1216 is shared by strand 1208 and strand 1210.

The strands created here are allocated to and executed by CPUs. Each strand can be allocated to one CPU so that all the strands will be executed in parallel (this case, however, involves synchronization processing for each iteration of the simulation). However, it is preferred that strand sets, each containing several strands, be so created that each strand set will be allocated to an individual CPU in view of the cost of communication among CPUs or the number of available CPUs.

In this case, if a strand including a shared block as mentioned above is allocated to another CPU, processing corresponding to the shared block will be executed by respective CPUs (i.e., processing will be redundantly performed on different CPUs).

Further, as mentioned above, when plural strands are all put into a strand set and the strand set is allocated to and executed by one CPU, the execution sequence of each strand in the strand set is optional, but it can be such that a strand requiring input from another strand belonging to another strand set is executed as late as possible and a strand giving output to another strand belonging to another strand set is executed as early as possible to extend the time interval from when data to be exchanged across strand sets (i.e., across CPUs) is ready until the data is actually required in order to perform communication (e.g., for software prefetch or the like) during the simulation processing, thereby enabling concealment of communication delay among processors.

While this invention has been described based on the specific embodiments, this invention is not limited to these specific embodiments. It should be understood that various configurations and techniques such as modifications and replacements, which would be readily apparent to those skilled in the art, are also applicable. For example, this invention is not limited to the architecture of a specific processor, the operating system and the like.

It should also be understood that, although the aforementioned embodiment has been described by taking MATLAB®/Simulink® as an example, the invention is not limited thereto, and is applicable to any other modeling tool.

What is claimed is:

1. A computer-implemented method of parallelizing a code configured by coupling a functional block having an internal state and a functional block without any internal state, said method comprising:
   creating and storing, in a memory of a computer, a graphical representation on which said functional blocks are chosen as nodes and connections between said functional blocks are chosen as links;
   visiting said nodes on said graphical representation sequentially;
   detecting inputs from said functional blocks without any internal state to functional blocks having an internal state and storing said functional blocks having said internal state in said memory as a set of use blocks, and detecting inputs from said functional blocks having an internal state to said functional blocks without any internal state and storing said functional blocks having said internal state in said memory as a set of definition blocks; and
   forming strands of functional blocks based on information on said set of use blocks and information on said set of definition blocks stored in association with said functional blocks,
   wherein said strands are formed according to the following conditions:
   (i) if the number of use blocks is 0 and the number of definition blocks is 0, assigning a corresponding functional block to a strand identical to that of adjacent blocks with the number of use blocks equal to 0 and the number of definition blocks equal to 0;
   (ii) if the number of use blocks is 0 and the number of definition blocks is 1, assigning said corresponding functional block to a strand identical to that of adjacent blocks with the number of use blocks equal to 0;
   (iii) if the number of use blocks is 0 and the number of definition blocks is greater than 1, assigning said corresponding functional block to a strand identical to that of adjacent blocks with the number of use blocks equal to 0;
   (iv) if the number of use blocks is 1 and the number of definition blocks is 0, assigning said corresponding functional block to a strand identical to that of adjacent blocks with the number of definition blocks equal to 0; and
   (v) if the number of use blocks is 1 and the number of definition blocks is 1, assigning said corresponding functional block to a strand identical to that of said definition block.

2. The method according to claim 1, further comprising:
   storing, in said memory, said nodes as a set of use blocks and a set of definition blocks in association with said nodes in response to a case where said nodes are found as functional blocks having an internal state after said nodes are sequentially visited on said graphical representation.

3. The method according to claim 1, wherein said strands are formed according to the following additional conditions:
   (vi) if the number of use blocks is 1 and the number of definition blocks is greater than 1, assigning said corresponding functional block to a strand identical to that of said use block;
   (vii) if the number of use blocks is greater than 1 and the number of definition blocks is 0, assigning said corresponding functional block to a strand identical to adjacent blocks with the number of definition blocks equal to 0;
   (viii) if the number of use blocks is greater than 1 and the number of definition blocks is 1, assigning said corresponding functional block to a strand identical to that of said definition block; and
   (ix) if the number of use blocks is greater than 1 and the number of definition blocks is greater than 1, assigning said corresponding functional block to strands of respective use blocks in said set of use blocks.

4. The method according to claim 1, further comprising:
   compiling said strands individually and generating an executable code; and
   allocating said generated executable code individually to a computer core or processor to cause said core or processor to execute said executable code.

5. A non-transitory article of manufacture embodying computer readable instructions which when implemented, causes a computer to perform the steps of a computer-implemented method for parallelizing a code configured by coupling a functional block having an internal state and a functional block without any internal state, said method comprising the steps of:
   creating and storing, in a memory of said computer, a graphical representation on which said functional blocks are chosen as nodes and connections between said functional blocks are chosen as links;
   visiting said nodes on said graphical representation sequentially, and (i) detecting inputs from said functional blocks without any internal state to functional blocks having an internal state and storing said functional blocks having said internal state in said memory as a set of use blocks, and (ii) detecting inputs from said functional blocks having an internal state to said functional blocks without any internal state and storing said functional blocks having said internal state in said memory as a set of definition blocks; and forming strands of functional blocks based on information on said set of use blocks and information on said set of definition blocks stored in association with said functional blocks, wherein said strands are formed according to the following conditions:

(i) if the number of use blocks is 0 and the number of definition blocks is 0, assigning a corresponding functional block to a strand identical to that of adjacent blocks with the number of use blocks equal to 0 and the number of definition blocks equal to 0; and (ii) if the number of use blocks is 0 and the number of definition blocks is 1, assigning said corresponding functional block to a strand identical to that of adjacent blocks with the number of use blocks equal to 0.

6. The non-transitory article of manufacture according to claim 5, causing said computer to further execute a step of:

storing, in said memory, said nodes as a set of use blocks and a set of definition blocks in association with said nodes in response to a case where said nodes are found as functional blocks having an internal state after said nodes are sequentially visited on said graphical representation.

7. The non-transitory article of manufacture according to claim 5, wherein said strands are formed according to the following conditions additional condition:

(iii) if the number of use blocks is 0 and the number of definition blocks is greater than 1, assigning said corresponding functional block to a strand identical to that of adjacent blocks with the number of use blocks equal to 0.

8. The non-transitory article of manufacture according to claim 5, said article of manufacture causing said computer to further execute a step of: compiling said strands individually and generating an executable code; and allocating said generated executable code individually to a computer core or processor to cause said core or processor to execute said executable code.

9. The non-transitory article of manufacture according to claim 7, wherein said strands are formed according to the following additional condition:

(iv) if the number of use blocks is 1 and the number of definition blocks is 0, assigning said corresponding functional block to a strand identical to that of adjacent blocks with the number of definition blocks equal to 0.

10. The non-transitory article of manufacture according to claim 9, wherein said strands are formed according to the following additional condition:

(v) if the number of use blocks is 1 and the number of definition blocks is 1, assigning said corresponding functional block to a strand identical to that of said definition block.

11. The non-transitory article of manufacture according to claim 10, wherein said strands are formed according to the following additional condition:

(vi) if the number of use blocks is 1 and the number of definition blocks is greater than 1, assigning said corresponding functional block to a strand identical to that of said use block.

12. The non-transitory article of manufacture according to claim 11, wherein said strands are formed according to the following additional condition:

(vii) if the number of use blocks is greater than 1 and the number of definition blocks is 0, assigning said corresponding functional block to a strand identical to adjacent blocks with the number of definition blocks equal to 0.

13. The non-transitory article of manufacture according to claim 12, wherein said strands are formed according to the following additional condition:

(viii) if the number of use blocks is greater than 1 and the number of definition blocks is 1, assigning said corresponding functional block to a strand identical to that of said definition block.

14. The non-transitory article of manufacture according to claim 13, wherein said strands are formed according to the following additional condition:

(ix) if the number of use blocks is greater than 1 and the number of definition blocks is greater than 1, assigning said corresponding functional block to strands of respective use blocks in said set of use blocks.

15. A computer-implemented system for parallelizing a code configured by coupling a functional block having an internal state and a functional block without any internal state, said system comprising:

a memory of a computer;

an analysis module for creating and storing, in said memory of said computer, a graphical representation on which said functional blocks are chosen as nodes and connections between said functional blocks are chosen as links; and a strand creation module for (i) visiting said nodes on said graphical representation sequentially, detecting inputs from said functional blocks without any internal state to functional blocks having an internal state and storing said functional blocks having said internal state in said memory as a set of use blocks, and detecting inputs from said functional blocks having an internal state to said functional blocks without any internal state and storing said functional blocks having said internal state in said memory as a set of definition blocks, and (ii) for forming strands of functional blocks based on information on said set of use blocks and information on said set of definition blocks stored in association with said functional blocks, wherein said strand creation module further forms said strands according to the following conditions:

(i) if the number of use blocks is 0 and the number of definition blocks is 0, assigning a corresponding functional block to a strand identical to that of adjacent blocks with the number of use blocks equal to 0 and the number of definition blocks equal to 0; and (ii) if the number of use blocks is 0 and the number of definition blocks is 1, assigning said corresponding functional block to a strand identical to that of adjacent blocks with the number of use blocks equal to 0.

16. The system according to claim 15, further comprising:

a storage unit storing, in said memory, said nodes as a set of use blocks and a set of definition blocks in association with said nodes in response to a case where said nodes are found as functional blocks having an internal state after said nodes are sequentially visited on said graphical representation.

17. The system according to claim 15, wherein said strand creation module further forms said strands according to the following additional conditions:

(iii) if the number of use blocks is 0 and the number of definition blocks is greater than 1, assigning said corresponding functional block to a strand identical to that of adjacent blocks with the number of use blocks equal to 0;

(iv) if the number of use blocks is 1 and the number of definition blocks is 0, assigning said corresponding functional block to a strand identical to that of adjacent blocks with the number of definition blocks equal to 0; and (v) if the number of use blocks is 1 and the number of definition blocks is 1, assigning said corresponding functional block to a strand identical to that of said definition block.

18. The system according to claim 15, further comprising:

a compiler for compiling said strands individually and generating an executable code; and an allocation unit for allocating said generated executable code individually to a computer core or processor to cause said core or processor to execute said executable code.

19. The system according to claim 17, wherein said strand creation module further forms said strands according to the following additional conditions:

(vi) if the number of use blocks is 1 and the number of definition blocks is greater than 1, assigning said corresponding functional block to a strand identical to that of said use block; and (vii) if the number of use blocks is greater than 1 and the number of definition blocks is 0, assigning said corresponding functional block to a strand identical to adjacent blocks with the number of definition blocks equal to 0.

20. The system according to claim 19, wherein said strand creation module further forms said strands according to the following additional conditions:

(viii) if the number of use blocks is greater than 1 and the number of definition blocks is 1, assigning said corresponding functional block to a strand identical to that of said definition block; and (ix) if the number of use blocks is greater than 1 and the number of definition blocks is greater than 1, assigning said corresponding functional block to strands of respective use blocks in said set of use blocks.

\* \* \* \* \*